April 30, 1963   A. B. CUNNINGHAM ET AL   3,087,674
FOURIER TRANSFORM SIGNAL GENERATOR Filed Dec. 22, 1961                                3 Sheets-Sheet 1

INVENTORS.
ALLEN B. CUNNINGHAM,
FRANK N. TULLOS,
BY John B. Davidson
ATTORNEY.

INVENTORS.
ALLEN B. CUNNINGHAM,
FRANK N. TULLOS,
BY John B Davidson
ATTORNEY.

3,087,674
Patented Apr. 30, 1963

3,087,674
FOURIER TRANSFORM SIGNAL GENERATOR
Allen B. Cunningham and Frank N. Tullos, Houston, Tex., assignors, by mesne assignments, to Jersey Production Research Company, Tulsa, Okla., a corporation of Delaware
Filed Dec. 22, 1961, Ser. No. 161,580
8 Claims. (Cl. 235—197)

This invention relates generally to signal generators, and more particularly to apparatus for performing a Fourier analysis of an electrical signal. Another aspect of the invention relates to the production of a sinusoidal signal of known time-phase relative to a start signal.

Many applications have been found in various scientific fields for the Fourier Transform.

$$F(\omega) = \int_{-\infty}^{\infty} f(t) \, \epsilon^{-j\omega t} dt$$

This transform relates to a function of time, $f(t)$, to a function of frequency, $F(\omega)$. In the past it has been customary to make an analytical computation of the Fourier Transform. However, such a computation requires that the exact mathematical definition or equation for the time function, $f(t)$, be known. There are many circumstances in various scientific fields under which it is exceedingly difficult to obtain the equation for the time function, although the function itself in analog form is available as an electrical signal. For example, in seismic prospecting it is possible to obtain an electrical signal indicative of a seismic impulse by placing a geophone in the immediate vicinity of the location at which the earth is impulsed, as by the detonation of a charge of dynamite, or by dropping a heavy weight on the earth's surface. A further example is in the field of medicine where it has become possible to detect complex, low frequency electrical brain waves which are useful in diagnosing various ailments of the human body. As an additional example, in the field of oceanography electrical signals can be produced which are indicative of ocean waves. It is highly desirable to perform a Fourier analysis of such electrical signals, but their complexity almost precludes obtaining a mathematical equation that can be said to be truly representative of the electrical signals. Manifestly, it is highly desirable to be able to perform a Fourier analysis directly on the electrical signals.

In accordance with one aspect of the invention, an electrical signal to be analyzed, which is necessarily of a given time duration, is multiplied with sinusoidal and cosinusoidal signals of a given frequency to obtain a pair of signals which may be represented by the equations $f(t) \sin \omega t$ and $f(t) \cos \omega t$. These signals individually integrated to obtain electrical signals which may be represented by the equations $$\int_a^b f(t) \cos \omega t$$

and $$\int_a^b f(t) \sin \omega t$$

The latter signals are thereupon combined by means adapted to produce an output signal indicative of the square root of the sum of the squares of said latter signals. By varying the given frequency over the frequency range of interest and recording the magnitude of said output signal obtained at each frequency, there is obtained an analog record corresponding to a Fourier analysis of the signal to be analyzed.

A particular aspect of the invention relates to a signal generator for producing sinusoidal signals that is particularly adapted for use with apparatus for performing a Fourier analysis as described above. The time-phase of the sinusoidal and cosinusoidal signals relative to signals to be analyzed must be very exactly controllable. The signal generator for producing such signals makes use of a rectangular wave signal source connected to an electrical integrator by a controllable switching means, such as a transistor switch or a relay. The triangular wave output voltage from the integrator is applied to circuit means for producing an output pulse when the triangular wave voltage achieves a given magnitude or magnitudes. The output pulses are used to control the rectangular wave signal source so that the output voltage thereof switches in polarity upon reception thereby of each pulse. The triangular wave output voltage is also applied to a function shaping circuit such that its triangular wave shape is modified to substantially sinusoidal wave shape. The output voltage of the integrator at the instant of activation of the switching means to connect the rectangular wave source to the signal integrator determines the phase relationship of the output voltage of the function shaping circuit.

Objects and features of the invention not apparent from the above discussion will become evident upon consideration of the following description when taken in connection with the accompanying drawings, wherein.

In connection with the present invention, it is necessary that the electrical signal to be analyzed be previously recorded in reproducible form. There is now commercially available a number of types of apparatus for so recording electrical signals. The most successful type of apparatus for this purpose has been found to be the magnetic tape recorder. However, in accordance with the invention, other types of apparatus, such as those making use of photographic techniques, may be utilized.

Figure 1:
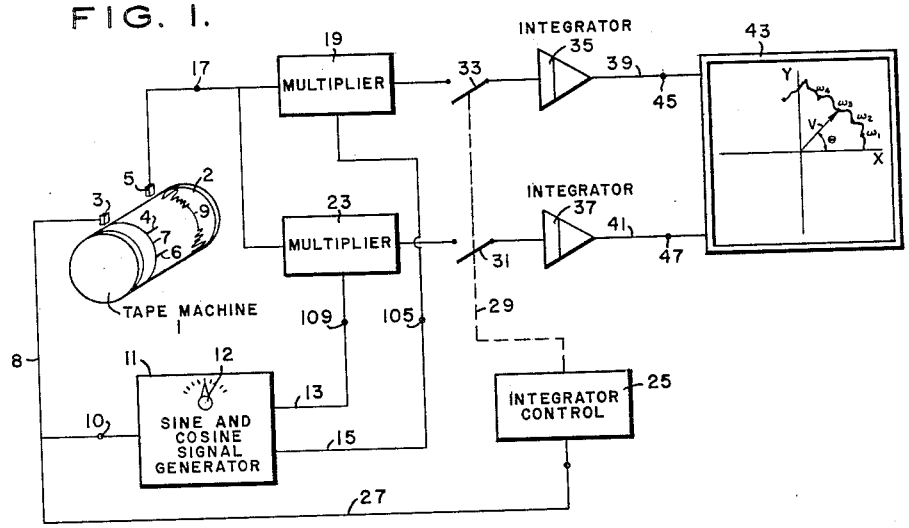
FIG. 1 is a schematic diagram of an embodiment of the invention wherein is provided a plot of the magnitude of the Fourier Transform as well as the phase angle of the transform.

In FIG. 1 there is shown in schematic form a magnetic tape recording and reproducing machine 1 which makes use of one or more recording and reproducing heads 3 and 5 for recording and reproducing electrical signals by varying the magnetization of a magnetic tape 2 carried by the tape machine. It is assumed that the electrical signal to be analyzed has been previously recorded on the magnetic tape 2 in the form of a record trace 9. It is further assumed that a separate trace 7 has been recorded on the tape having impulse recordations 4 and 6 corresponding respectively to the beginning and the end of the electrical signal to be analyzed. Thus, an impulse will be produced by recording head 3 at the beginning of the reproduction of the signal recorded as trace 9, and another pulse will be produced at the end of the reproduction of the record trace head 5.

There is further provided a first means having a control circuit and first and second output circuits for producing for a predetermined time interval a sinusoidal electrical signal of constant frequency in said first output circuit, and a cosinusoidal constant amplitude electrical signal of the same frequency in the second output circuit responsive to an electrical starting signal applied to the control circuit. This means is depicted in FIG. 1 as the sine and cosine signal generator 11. The electrical circuit for this generator will be described in detail in connection with FIG. 3. The sine and cosine signal generator is provided with an input terminal 10 and output leads 13 and 15. A control member 12 is mechanically connected to the sine and cosine signal generator for controlling the frequency of the output signals thereof. Magnetic pickup head 3 is electrically connected to terminal 10 by electrical lead 8 and is further connected to integrator control apparatus 25 (described below) by electrical lead 27.

The output signal from magnetic pickup head 5 is electrically connected to the input circuits of a pair of electrical multipliers 19 and 23 by electrical lead 17. The electrical multiplying circuits 19 and 23 may be of the type commercially available from Electronic Associates, Inc. of Long Branch, New Jersey, and designated model 16-75. The input terminal 109 of multiplier 23 is connected to the output lead 13 of signal generator 11 upon which appears an electrical signal which may be described as indicative of the function $\sin \omega(t)$ as distinguished from the signal simultaneously appearing on output lead 15, which may be described as being indicative of the function $\cos \omega(t)$. The input terminal 105 of multiplier 19 is electrically connected to output lead 15 of signal generator 11. Electrical multiplier 19 thus produces an output signal indicative of the function $f(t) \cos \omega(t)$ while multiplier 23 produces a signal indicative of the function $f(t) \sin \omega t$.

The output circuits of multipliers 19 and 23 are respectively connected to the input circuits of the integrating circuits 35 and 37 through switches 33 and 31. Switches 33 and 31 are simultaneously controlled by the integrator control 25. The switches are mechanically connected to the integrator control 25 by connection 29. The integrator control 25 is controlled by the output pulses produced from magnetic pickup head 3. The details of the integrator control will be described in connection with FIG. 6.

The integrators 35 and 37 may be conventional integrating amplifiers such as are well known to the art.

The output signals of integrating circuits 35 and 37 are coupled by leads 39 and 41 to a means for deriving a signal indicative of the square root of the sum of the squares of the output signals of the integrating circuits. In the embodiment of the invention shown in FIG. 1, this means comprises a rectilinear coordinate plotter 43 which may be an apparatus built by Electronic Associates, Inc. of Long Branch, New Jerrey and designated by them a Variplotter Model 1100E. This apparatus 43 functions to provide a coordinate plot of the sum of the square roots of electrical signals connected to the input terminals 45 and 47 thereof wherein the voltage of the signal applied to terminal 45 controls the distance of the record point from the axis of abscissas, and the voltage of the signal applied to terminal 47 determines the distance of the record point from the axis of ordinates.

The operation of the apparatus described above is as follows. When the signal generator is activated, the control mechanism 12 is adjusted to provide an output signal of given frequency from the signal generator 11. The magnetic pickups 3 and 5 are positioned adjacent the traces before the point at which the signal to be analyzed begins to be reproduced and between impulse recordations 4 and 6 on trace 7. When the reproducing machine is started, the pulse from head 3 activates the sine and cosine signal generator and integrator control 25 to produce output signals on leads 13 and 15 and to close switches 33 and 31. The recording apparatus 43 records a point on the recording medium or paper thereof, as at the point marked $\omega_1$ in FIG. 1. The frequency of the signal produced by signal generator 11 is slowly varied or is adjusted to a plurality of different signals over the frequency range of interest. A plot such as is shown on the recorder 43 in FIG. 1 is obtained. The length of the vector V from the origin, point (0,0), to a given plotted mark represents the magnitude of the Fourier Transform for the frequency of the output signal generator 11 used to obtain that mark, and the angle $\theta$ between the vector and the abscissa represents the angle of the transform.

Figure 2:
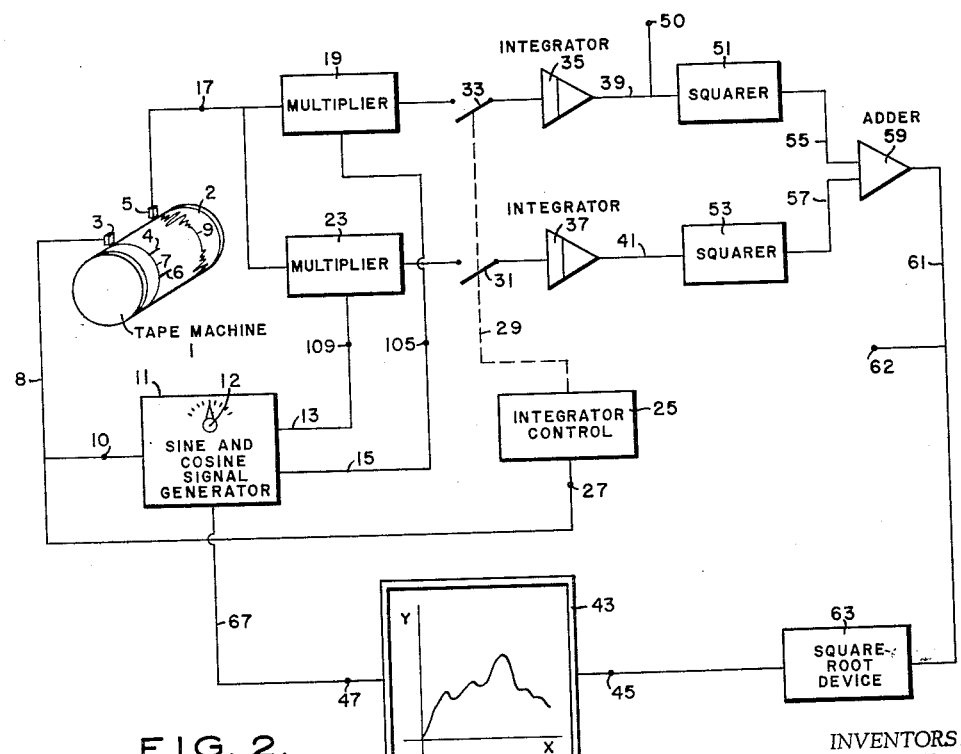
FIG. 2 is a schematic diagram of another embodiment of the invention for providing a plot of the magnitude of the transform as a function of frequency.

In certain respects, the apparatus illustrated in FIG. 2 is the same as the apparatus illustrated in FIG. 1. As in the apparatus of FIG. 1, the magnetic tape recorder 1 is provided with reproducing heads 3 and 5 which reproduce traces recorded on magnetic tape carried by the recording and reproducing mechanism 1. The head 3 is electrically connected to control terminal 10 of signal generator 11 and to the integrator control mechanism 25. Magnetic head 5 is electrically connected to input circuits of multiplying circuits 19 and 23. The output leads 13 and 15 of signal generator 11 are connected to input terminals 109 and 105 of multipliers 23 and 19, respectively. The output signals of multipliers 19 and 23 appearing on leads 20 and 22 are connected to the input circuits of integrators 35 and 37 through switches 33 and 31, respectively. Otherwise, the embodiment of FIG. 2 differs from the embodiment of FIG. 1. The signals appearing on output leads 39 and 41 of integrating circuits 35 and 37, respectively, are respectively applied to squaring circuits 51 and 53. The squaring circuits may be conventional diode squares of a type well known to the art. The output signals from electrical squaring devices 51 and 53 appear on leads 55 and 57 and are summed by an electrical adding circuit 59 to obtain an output signal indicative of the sum of the squares of the signals appearing on leads 39 and 41. The electrical output signal from adding circuit 59 appearing on lead 61 is applied to an electrical square root taking circuit 63, which may be of the type illustrated at page 3 of "Manual on Diode Function Generator 16.015" published by Electronic Associates, Inc., using function generator 16.022-1 in the feedback circuit of an operational amplifier. The output signal on output lead 65 of circuit 63 is indicative of the square root of the sum of the squares of the signals appearing on leads 39 and 41. Electrical lead 65 is connected to input terminal 45 of recording apparatus 43, which is the same as the recording apparatus used in connection with the apparatus illustrated in connection with FIG. 1. Signals appearing on lead 65 are operative to produce record deflections away from the axis of abscissas of the recording mechanism.

A direct voltage is derived from the signal generator 11 which is proportional to the frequency of the electrical signals produced from the signal generator 11. This voltage appears on lead 67 and is applied to input terminal 47 of recording apparatus 43 to produce record deflections away from the axis of ordinates of the recording mechanism.

The operation of the apparatus described above is as follows. Recording heads 3 and 5 are adjusted as described above. The recording apparatus is activated with the output signal of signal generator 11 set at a given frequency. Integrator control 25 will close switches 33 and 31 as soon as a pulse is produced from magnetic pickup head 3. The electrical output signals from the signal generator 11 are cross-multiplied with the output signal from head 5 by multipliers 19 and 23 to produce signals indicative of the function $f(t) \cos \omega t$ and $f(t) \sin \omega t$. These signals are integrated by integrators 35 and 37, the integrated signals are squared by squares 51 and 53, and the squared signals are added together by adding circuit 59. The resulting signal is applied to square root taking device 63 to produce an output signal indicative of the magnitude of the Fourier Transform. This signal is applied to the terminal 45 to produce a record deflection away from the axis abscissas of the recording mechanism 43. The output signal of signal generator 11 either is adjusted to each of a plurality of frequencies, or is very slowly and continuously varied over the range of frequencies of interest to produce a plot on the recording mechanism 43 as illustrated in FIG. 2, which plot is indicative of the magnitude of the Fourier Transform as a function of the frequency of the output signal from signal generator 11.

Figure 3:
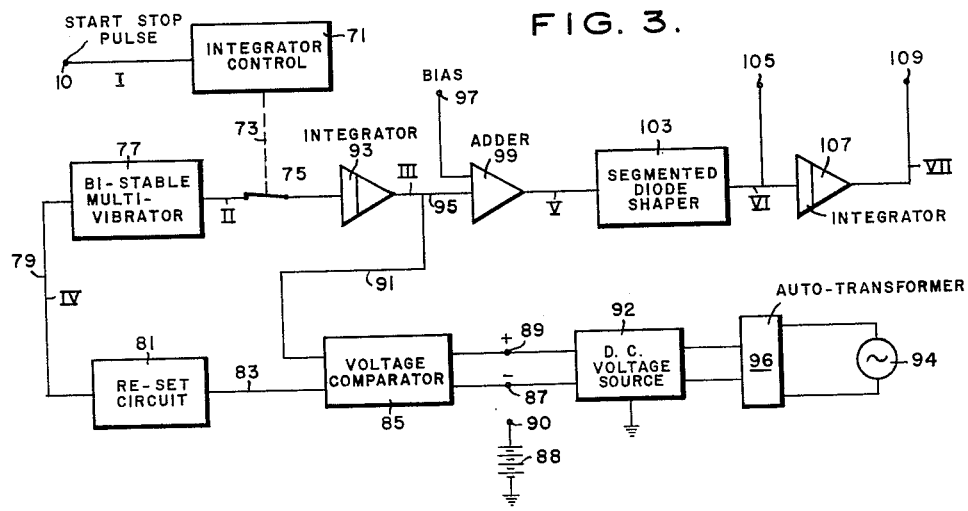
FIG. 3 is a schematic diagram of a sinusoidal wave generator particularly adapted for use in the circuits of FIGS. 1 and 2.

In FIG. 3 there is shown apparatus particularly suitable for use as the signal generator 11 described in FIGS. 1 and 2. The apparatus includes a conventional integrating circuit 93 for the purpose of integrating the rectangular wave output voltage from bistable multivibrator 77. The output voltage from multivibrator 77 is coupled to the input circuit of integrator 93 by means of lead 70 controlled by electrical switch 75. The bistable multivibrator 77 is triggered by pulses on lead 79 from apparatus for producing an output pulse whenever the output voltage of integrator 93 attains a predetermined magnitude. This apparatus comprises a voltage comparator circuit 85 connected to the output lead 95 of integrator 93 by lead 91, and a reset circuit 81 connected to voltage comparator 85 by lead 83. A circuit suitable for use as voltage comparator circuit 85 and reset circuit 81 is described below. The output pulses from the reset circuit 81 appear on lead 79 to trigger the bistable multivibrator 77. The voltage comparator is provided with terminals 89 and 87 to which are connected substantially equal magnitude voltages, the voltage coupled to terminal 89 being positive relative to ground, and the voltage appearing at terminal 87 being negative relative to ground. The voltages are derived from a variable voltage D.C. source 92. The output voltage of the D.C. source may be varied by controlling the amplitude of an alternating current signal applied thereto from an alternating current source 94 through an autotransformer 96 or other device for varying the voltage amplitude from source 94. The purpose of providing a variable amplitude D.C. source 92 is to control the frequency of the output signal of the system.

The output voltage from integrator 93 is applied to an adding circuit 99. A D.C. bias voltage from terminal 97 is also applied to the adder 99 so that the output waveform of the adder is a triangular wave which varies equally about zero voltage. The output voltage of the adding circuit 99 is applied to a function signal circuit 103 which may be a segmented diode shaper, such as is described below with respect to FIG. 7, or a biased diode function shaping circuit. The function of the circuit 103 is to shape the triangular wave output voltage of circuit 99 to a substantially sinusoidal waveform. The output voltage of the function circuit 103 is applied to an output terminal 105 to be representative of the function $\cos \omega t$, and to the input circuit of an integrator 107 such that the output voltage of the integrator applied to terminal 109 is indicative of the function $\sin \omega t$. The terminals 105 and 109 are the same as the correspondingly numbered terminals in FIGS. 1 and 2.

For the purpose of providing an output voltage indicative of the frequency of signals appearing at terminals 105 and 109, a D.C. source 88 having an output terminal 90 is provided. The output voltage of source 88 is substantially above the highest voltage applied to terminal 89 by D.C. source 92. The difference between the voltages at terminals 89 and 90 is a direct function of the frequency of the signals appearing at terminals 105 and 109.

Figure 4:
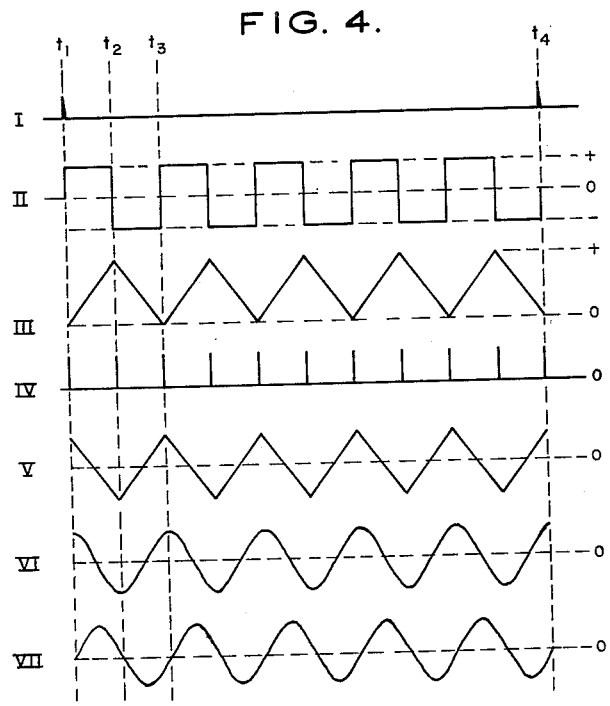
FIG. 4 is a waveform representation of electrical signals at various points in the circuit of FIG. 3, which waveforms are useful in understanding the operation of the circuit of FIG. 3.

The operation of the circuit of FIG. 3 will become evident from the following description when considered in connection with the waveforms shown in FIG. 4. The waveform I represents the output pulses from recording head 3 (see FIGS. 1 and 2) at times $t_1$ and $t_4$. At time $t_1$ integrator control circuit 71, which may be a circuit such as will be described in connection with FIG. 6, closes switch 75 to apply the output voltage from multivibrator 77 to integrator 93. The output voltage from integrator 93 will rise as shown by waveform III between times $t_1$ and $t_2$. At time $t_2$ the voltage applied to voltage comparator 85 by integrator 93 will equal the voltage at terminal 89. This will energize reset circuit 81 to produce an output pulse 79 as indicated at time $t_2$ on waveform IV. The output pulse from reset circuit 81 will trigger multivibrator 77 to reverse the polarity of the output voltage thereof. The output voltage from integrator 93 will decrease, will reverse in polarity, and will thereafter increase until it equals the voltage at terminal 87 at time $t_3$. Voltage comparator 85 will again activate reset circuit 81 to produce an output pulse to again trigger bistable multivibrator 77. The end result will be the triangular shaped waveform shown in FIG. 3 but produced by integrator 93. This voltage applied to adder 99 will produce an output voltage waveform V shown in FIG. 4. The output waveforms appearing at terminals 105 and 109 are designated VI and VII in FIG. 4.

Figure 5:
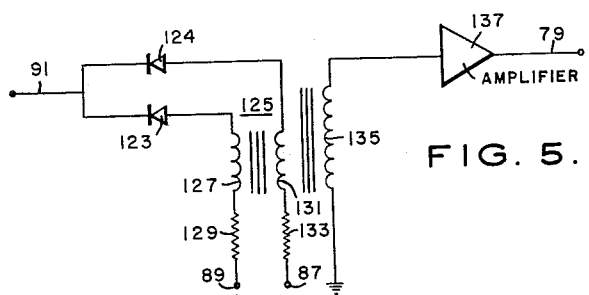
FIG. 5 is an electrical schematic diagram of the voltage comparator and reset circuit shown in FIG. 3.

A suitable circuit for use as the voltage comparator circuit and the reset circuit of FIG. 4 is illustrated in FIG. 5. This circuit includes a pulse transformer 125 having primary windings 127 and 131, and a secondary winding 135. The primary windings 127 and 131 are respectively connected to lead 91 (see FIG. 3) by half-wave rectifiers 123 and 124. The windings 127 and 131 are also connected to terminals 89 and 87 by means of current limiting resistors 129 and 133, respectively. The secondary winding 135 is connected to lead 79 (see FIG. 3) by an amplifier 137. The other terminal of winding 135 is connected to ground. When the voltage appearing at lead 91 becomes positive with respect to the voltage at terminal 89, a pulse of current will flow through winding 127 to produce an output pulse across secondary winding 135, which will be amplified and applied to lead 79. Likewise, when the voltage appearing at terminal 91 becomes negative with respect to the voltage at terminal 89, a pulse of current will flow through winding 131, which will produce a pulse on lead 79. By suitably winding the primary windings 127 and 131, the pulses appearing at lead 79 may be made to be of the same polarity.

Figure 6:
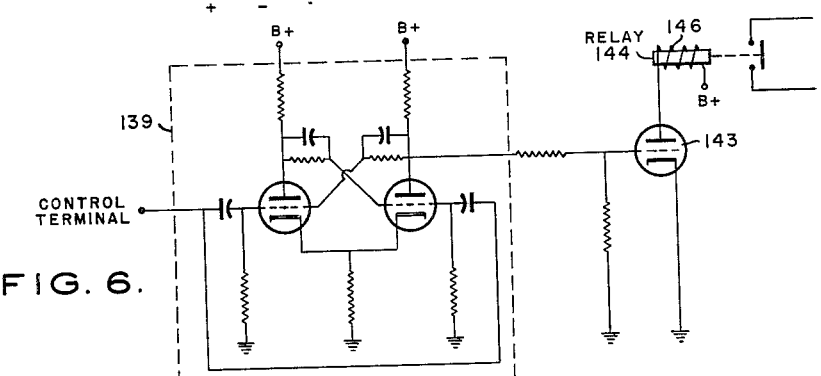
FIG. 6 is an electrical schematic diagram of apparatus suitable for use as integrator controls in the apparatus depicted in FIGS. 1, 2, and 3.

In FIG. 6 there is illustrated apparatus suitable for use in the circuits of FIGS. 1, 2, and 3 as the integrator control circuits 25 and 71. This apparatus comprises a bistable multivibrator 139 having an input terminal to which control pulses are applied. This control terminal corresponds to terminal 10 for integrator control 71, and terminal 26 for integrator control circuit 25. The output pulses from the bistable multivibrator are applied to the grid of vacuum tube 143. Vacuum tube 143 is biased to nonconduction when the bistable multivibrator is in one conducting state thereof, and is biased to conduction when the bistable multivibrator is in the other conducting state thereof. When vacuum tube 143 is biased to conduction, current will flow through winding 146 in the plate circuit of the vacuum tube 143 so that the armature of relay 144 will move to close the contacts of switch or switches actuated thereby.

Figure 7:
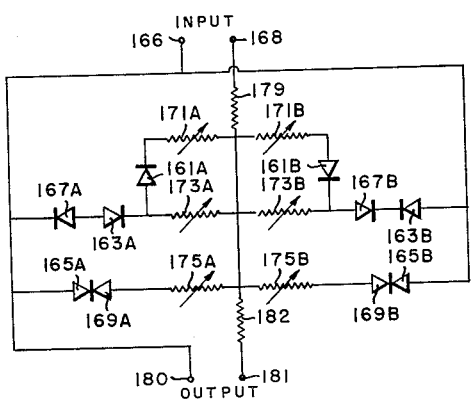
FIG. 7 is an electrical schematic diagram of a segmented diode function shaping circuit for use in the apparatus depicted in FIG. 3.

In FIG. 7 there is shown a schematic diagram of the function shaping circuit 103 of FIG. 3. The circuit is designed to shape a triangular wave input voltage applied between input terminals 166, 168 to a substantially sinusoidal output voltage between output terminals 180, 181. Terminals 166 and 180 are directly connected, while terminals 168 and 181 are connected by serially connected voltage dropping resistor 179 and isolating resistor 182. Zener diode 165A, half-wave rectifier 169A, and variable resistor 175A are serially connected between terminal 166 and the juncture of the resistors 179 and 182. Likewise, Zener diode 163A, half-wave rectifier 167A, and variable resistor 173A are also connected between terminal 166 and the juncture of the resistor 179 and 182. Zener diode 161A and variable resistor 171A are connected in parallel with variable resistor 173A.. The function of half-wave rectifier 167A and 169A is to oppose current flow between terminals 166 and 168 when terminal 166 is positive with respect to terminal 168. The constants of Zener diodes 165A, 163A, and 161A are such that the Zener voltage of diode 165A is less than that of diode 163A, which in turn is less than that of diode 161A. Correspondingly numbered circuit elements having the suffix "B" are connected between the juncture of resistors 179, 182 and terminal 166 so that progressively increasing current will flow as the result of Zener diode breakdown when terminal 168 is positive with respect to terminal 166.

Figure 8:
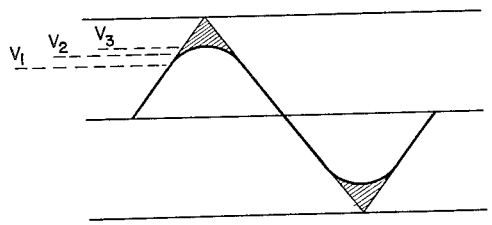
FIG. 8 is a waveform illustrating the operation of the apparatus of FIG. 7.

The operation of the circuit of FIG. 7 is as follows. As terminal 166 becomes increasingly positive with respect to terminal 168, current flow through resistors 179 and 182 will result only because of a load placed across output terminals 180, 181. However, at a given voltage marked $V_1$ on the waveform of FIG. 8, Zener diode 165A will break down to cause a somewhat greater drop across resistor 179, thus affecting the slope of the voltage appearing across the output terminals 180, 181. When the voltage between terminals 166, 168 attains magnitude $V_2$, diode 163A will break down causing an even greater drop across resistor 169, and at voltage $V_3$ diode 161A will break down to produce a still greater voltage drop across resistor 179. As the amplitude of the voltage decreases, diodes 161A, 163A, and 165A will stop conducting in the order named. The result is that the waveform of the voltage appearing across terminals 180, 181 is modified to more nearly correspond to a sinusoidal waveshape. For the purpose of more exactly shaping the voltage across terminals 180, 181 to sinusoidal waveshape, still other diodes may be added to the circuit in the same manner that diode 161A and resistor 171A are added across resistor 173A. The operation of the Zener diodes 161B, 163B, and 169B is exactly the same as that of the Zener diodes 161A, 163A, and 165A on each half cycle of the input voltage when terminal 168 is positive with respect to terminal 166.

The circuit shown in FIG. 3 is particularly suitable for use in the analyzing circuits illustrated in FIGS. 1 and 2. However, the circuit of FIG. 3 also is adapted for the purpose of measuring the response of electrical filters to signals of various frequencies and phase relationships.

The invention is not necessarily to be restricted to the specific structural details, arrangement of parts, or circuit connections herein set forth, as various modifications thereof may be effected without departing from the spirit and scope of this invention.

The objects and features of the invention having been completely described, what we wish to claim is:

1. Apparatus for converting a reproducible, variable-amplitude electrical signal into a signal having an amplitude indicative of the amplitude of the frequency components of the variable-amplitude electrical signal, comprising:

first means having a control circuit and first and second output circuits, for producing for a predetermined time interval a sinusoidal electrical signal of constant frequency in said first output circuit and a cosinusoidal constant amplitude electrical signal of the same frequency in said second output circuit responsive to an electrical starting signal applied to said control circuit;

first electrical circuit means electrically coupled to said first output circuit, for electrically multiplying the output signal from said first output circuit with said variable-amplitude electrical signal, and for integrating the resulting signal;

second electrical circuit means electrically coupled to said second output circuit, for electrically multiplying the output signal from said second output circuit with said variable-amplitude electrical signal, and for integrating the resulting signal; and means connected to said first electrical circuit means and to said second electrical circuit means, for deriving a signal indicative of the square root of the sum of the squares of the output signals of said first and second electrical circuit means.

2. Apparatus for converting a reproducible, variable-amplitude electrical signal into a signal having an amplitude indicative of the amplitude of the frequency components of the variable-amplitude electrical signal, comprising:

first means having a control circuit and first and second output circuits, for producing for a predetermined time interval a sinusoidal electrical signal of constant frequency in said first output circuit and a cosinusoidal constant amplitude electrical signal of the same frequency in said second output circuit responsive to an electrical starting signal applied to said control circuit;

electrical circuit means electrically coupled to said first and second output circuits, for electrically multiplying the output signal from said first output circuit with said variable-amplitude electrical signal to produce a first cross-multiplied signal, for electrically multiplying the output signal from said second output circuit with said variable-amplitude electrical signal to produce a second cross-multiplied signal, and for separately integrating said first and second cross multiplied signals; and means connected to said electrical circuit means, for deriving a signal indicative of the square root of the sum of the squares of said first and second cross-multiplied signals.

3. Apparatus for converting a reproducible, variable-amplitude electrical signal into a signal having an amplitude indicative of the amplitude of the frequency components of the variable-amplitude electrical signal, comprising:

first means having a control circuit and first and second output circuits, for producing for a predetermined time interval a sinusoidal electrical signal of controlled frequency in said first output circuit and a cosinusoidal constant amplitude electrical signal of the same frequency in said second output circuit responsive to an electrical starting signal applied to said control circuit;

first electrical circuit means electrically coupled to said first output circuit, for electrically multiplying the output signal from said first output circuit with said variable-amplitude electrical signal, and for integrating the resulting signal;

second electrical circuit means electrically coupled to said second output circuit, for electrically multiplying the output signal from said second output circuit with said variable-amplitude electrical signal, and for integrating the resulting signal;

means connected to said first electrical circuit means and to said second electrical circuit means, for deriving a signal indicative of the square root of the sum of the squares of the output signals of said first and second electrical circuit means; and means connected to said first means for varying the frequency of said sinusoidal and cosinusoidal electrical signals.

4. Apparatus for converting a reproducible, variable-amplitude electrical signal into a signal having an amplitude indicative of the amplitude of the frequency components of the variable-amplitude electrical signal, comprising:

9 first means having a control circuit and first and second output circuits, for producing for a predetermined time interval a sinusoidal electrical signal of controlled frequency in said first output circut and a cosinusoidal constant amplitude electrical signal of the same frequency in said second output circuit responsive to an electrical starting signal applied to said control circuit;

electrical circuit means electrically coupled to said first and second output circuits, for electrically multiplying the output signal from said first output circuit with said variable-amplitude electrical signal, to produce a first cross-multiplied signal for electrically multiplying the output signal from said second output circuit with said variable-amplitude electrical signal to produce a second cross-multiplied signal, and for separately integrating said first and second cross-multiplied signals;

means connected to said electrical circuit means, for deriving a signal indicative of the square root of the sum of the squares of said first and second cross-multiplied signals; and means connected to said first means, for varying the frequency of said sinusoidal and cosinusoidal electrical signals.

5. Apparatus for converting a reproducible, variable-amplitude electrical signal into a signal having an amplitude indicative of the amplitude of the frequency components of the variable-amplitude electrical signal, comprising:

first means having a control circuit and first and second output circuits, for producing for a predetermined time interval a sinusoidal electrical signal of constant frequency in said first output circuit and a cosinusoidal constant amplitude electrical signal of the same frequency in said second output circuit responsive to an electrical starting signal applied to said control circuit;

electrical circuit means connected to said first means, for deriving a signal indicative of the square root of the sum of the squares of the integrated product of the output signal from said first output circuit and said variable-amplitude electrical signal and the integrated product of the output signal from said second output circuit and variable-amplitude electrical signal; and means connected to said first means, for varying the frequency of said sinusoidal and cosinusoidal signals.

6. Apparatus for deriving a signal having an amplitude indicative of the amplitude of frequency components of a reproducible, variable-amplitude signal, comprising:

first circuit means having first, second, and third input signal channels, adapted to derive an output signal indicative of the square root of the sum of the squares of the integrated product of electrical signals applied to said first and second input channels, and the integrated product of electrical signals applied to said first and third input channels;

signal reproducing means having a first output circuit connected to said first input channel, and a second output circuit, adapted to reproduce said reproducible electrical signal in said first output circuit and to produce output pulses in said second output circuit at the initiation and conclusion of the reproduction of said reproducible electrical signals; and an electrical signal generating means connected to said output circuit and to said second and third input channels, adapted to supply a sinusoidal signal of controllable frequency to said second input channel and a cosinusoidal signal to said second input channel responsive to a pulse in said second output circuit at initiation of reproduction of said reproducible electrical signal by said signal reproducing means, and to stop supplying said sinusoidal signal and said

10 cosinusoidal signal responsive to a pulse in said second output circuit at conclusion of reproduction of said reproducible electrical signal.

7. Apparatus for deriving a signal having an amplitude indicative of the amplitude of frequency components of a reproducible, variable-amplitude signal, comprising:

first circuit means having first, second, and third input signal channels, adapted to derive an output signal indicative of the square root of the sum of the squares of the integrated product of electrical signals applied to said first and second input channels, and the integrated product of electrical signals applied to said first and third input channels;

signal reproducing means having a first output circuit connected to said first input channel, and a second output circuit, adapted to reproduce said reproducible electrical signal in said first output circuit and to produce output pulses in said second output circuit at the initiation and conclusion of the reproduction of said reproducible electrical signals;

bistable means adapted to produce a rectangular wave output voltage of controlled repetition rate responsive to a pulse train fed thereto;

first and second integrating circuit means, each having an input circuit and an output circuit and adapted to produce an output voltage indicative of the integral of an input voltage connected thereto;

means including voltage comparator circuit means coupled to said bistable means and to output circuit of said first integrating circuit means, operative to feed an output pulse to said bistable means responsive to attainment of predetermined magnitudes by the output voltage of said first integrating circuit means, for actuation of said bistable means;

control means including switch means connected to said second output circuit of said signal reproducing means and connecting the output of said bistable means to said input circuit of said first integrating circuit means, operative to actuate said switch means to successively connect and disconnect the output of said bistable means and said input circuit of said first integrating circuit means responsive to successive electrical pulses from said second output circuit of said signal reproducing means;

reference circuit means connected to the output circuit of said first integrating circuit means, for establishing reference voltage level whereat the output voltage of said first integrating circuit means varies equally about zero voltage;

function shaping circuit means connected to said reference circuit means to modify the output voltage of said reference circuit means to sinusoidal form to produce a cosinusoidal output signal;

the input circuit of said second integrating circuit means being connected to the output of said function shaping circuit means whereby a sinusoidal output voltage appears in the output circuit of said second integrating circuit means;

circuit means connecting the output of said function shaping circuit means to said second input channel;

circuit means for connecting the output of said second integrating circuit means to said first input channel; and means connected to said means including voltage comparator circuit means for varying the repetition rate thereof.

8. Apparatus for deriving a signal having an amplitude indicative of the amplitude of frequency components of a reproducible, variable-amplitude signal, comprising:

first circuit means for first, second, and third input signal channels, adapted to derive an output signal indicative of the square root of the sum of the squares of the integrated product of electrical signals applied to said first and second input channels, and the integrated product of electrical signals applied to said first and third input channels;

signal reproducing means have a first output circuit connected to said first input channel, and a second output circuit, adapted to reproduce said reproducible electrical signal in said first output circuit and to produce output pulses in said second output circuit at the initiation and conclusion of the reproduction of said reproducible electrical signals;

bistable means adapted to produce a rectangular wave output voltage of controlled repetition rate responsive to a pulse train fed thereto;

first and second integrating circuit means, each having an input circuit and an output circuit and adapted to produce an output voltage indicative of the integral of an input voltage connected thereto;

means including voltage comparator circuit means coupled to said bistable means and to the output circuit of said first integrating circuit means, operative to feed an output pulse to said bistable means responsive to attainment of predetermined magnitudes by the output voltage of said first integrating circuit means, for actuation of said bistable means;

control means including switch means connected to said second output circuit of said signal reproducing means and connecting the output of said bistable means to said input circuit of said first integrating circuit means, operative to actuate said switch means to successively connect and disconnect the output of said bistable means and said input circuit of said first integrating circuit means responsive to successive electrical pulses from said second output circuit of said signal reproducing means;

means including function shaping circuit means, connected to said first integrating circuit means to modify the triangular wave output voltage of said integrating circuit means to sinusoidal waveform and to produce therefrom a sinusoidal output and a cosinusoidal output signal;

circuit means connecting the sinusoidal output signal of said means including function shaping circuit means to said first input channel;

circuit means for connecting the cosinusoidal output signal of said means including function shaping circuit means to said second input channel; and means connected to said means including voltage comparator circuit means, for varying the repetition rate thereof.

No references cited.